United States Patent [19]

Gryc

[11] Patent Number: 5,373,957
[45] Date of Patent: Dec. 20, 1994

[54] LOW EXPULSION VENT FOR AN AUTOMOTIVE FUEL TANK

[75] Inventor: William S. Gryc, Hartland, Mich.
[73] Assignee: Ford Motor Company, Dearborn, Mich.
[21] Appl. No.: 148,234
[22] Filed: Nov. 8, 1993
[51] Int. Cl.⁵ ............................................. F16K 24/00
[52] U.S. Cl. .................... 220/86.1; 137/80; 137/202; 137/587
[58] Field of Search ............... 220/86.1; 137/80, 202, 137/587, 599

[56] References Cited

U.S. PATENT DOCUMENTS 2,613,013  10/1952  Pelt .
3,653,537   4/1972  Shiobara et al. .
3,698,160  10/1974  Hunter .
4,423,746   1/1984  Scheurenbrank et al. .
4,790,349  12/1988  Harris .
4,958,655   8/1990  Danek .
5,054,528  10/1991  Saitoh .

*Primary Examiner*—Joseph Man-Fu Moy
*Attorney, Agent, or Firm*—David B. Kelley; Roger L. May

[57] ABSTRACT

A fuel tank has a filler pipe to which a vent pipe is attached on one end and which divides into two openings on the other end within the fuel tank. One opening is positioned below the other opening relative to the top of the fuel tank and has means for preventing expulsion of fuel through the vent pipe when fuel tank pressure exceeds atmospheric. The other opening is positioned to be in vapor even when the tank is filled to maximum capacity. Fuel vapor vents through the openings during refueling until fuel entering the vent pipe through the lower opening blocks the flow of vapor, thereby limiting the fuel level within the tank.

14 Claims, 2 Drawing Sheets

LOW EXPULSION VENT FOR AN AUTOMOTIVE FUEL TANK

FIELD OF THE INVENTION

This invention relates to a vent for an automotive fuel tank, and, more particularly, to a fuel tank vent with a divided in-tank end having two openings and means on one of the openings to reduce fuel expulsion upon removal of the fuel filler pipe cap.

BACKGROUND OF THE INVENTION

During refueling of an automobile, liquid fuel entering the fuel tank displaces gases therein, such as air and fuel vapor. A vent pipe carries the gases to the tank exterior, typically venting directly to atmosphere or, alternatively, to a vapor handling device, such as a carbon canister. When the liquid fuel level covers the vent pipe opening, gases can no longer vent, thus causing a pressure increase which shuts off the fuel pump.

In addition to the just described fuel pump shut-off pressure, fuel tank pressure rises during normal engine operation for a variety of reasons. For example, hot fuel returning from the engine, fuel pump operation within the fuel tank, and normal diurnal temperature changes can increase fuel temperature within the fuel tank. Higher fuel temperature causes an increase in fuel evaporation and thus an increase in fuel vapor within the tank. Increased fuel vapor and fuel temperature can result in fuel tank pressure exceeding atmospheric pressure. With such conditions, sudden removal of the fuel filler pipe cap may result in fuel expulsion through the vent pipe, an obviously undesirable consequence.

The present invention provides a vapor venting apparatus which limits the fuel level within the tank while providing means for reducing fuel flow through the apparatus upon removal of the fuel filler pipe cap after fuel tank pressure increases above atmospheric pressure.

DESCRIPTION OF THE PRIOR ART

U.S. Pat. No. 4,790,349 (Harris) shows in FIG. 1 a vent pipe 30 attached to a distal portion 20 of the filler pipe 14 and having a fuel vapor control valve 24 mounted in the tank 12 exterior connected to the vent pipe 30. The control valve 24, which has many parts and is of complex construction, controls vapor pressure within the fuel tank 12 to prevent expulsion, unlike the present invention which physically obstructs fuel from entering the vent pipe with a plate.

In FIG. 1 of U.S. Pat. No. 4,958,655, a two fill level valve 20 is positioned in the fuel tank 10 at the end of a vent pipe 18 which connects to the fuel filler pipe 12 at the other end. The valve 20 uses a temperature responsive seal 34 on an inlet 28 to provide optimal usage of fuel tank volume. It does not, however, prevent fuel expulsion, for example in the winter months, since the temperature responsive seal 34 allows fuel to pour into housing 24 at the higher fill level without provision for obstructing fuel flow into valve 20.

A flap valve 8 for the filler neck I of a fire engine water storage tank T is shown in FIG. 1 of U.S. Pat. No. 2,613,013 (Van Pelt). Flap valve 8 in that disclosure, however, depends by gravity to the closed position and opens to allow water into tank T, unlike the present invention in which the plate, or flap valve, depends by gravity to the open position and closes the vent pipe opening to prevent fuel expulsion from the tank.

SUMMARY OF THE INVENTION

The present invention provides an apparatus for venting fuel vapor from an automotive fuel tank while reducing fuel expulsion therefrom after a tank pressure increase and removal of the filler pipe cap. A fuel filler pipe extends into the fuel tank and has an exterior section protruding from the fuel tank. A vent pipe has a first end in communication with the exterior section of the filler pipe and a second end which extends into the interior of the fuel tank. The second end has a first branch and a second branch, the second branch having an opening oriented below, relative to the top of the fuel tank, a vapor port in said first branch such that fuel filling the fuel tank causes the fuel level to rise and flow into the second branch until the fuel obstructs fuel vapor flow through the vent pipe, thus shutting off fuel flow into the tank in a known manner. The second branch has means for obstructing fuel flow through the second branch when a pressure differential exists between the interior of the fuel tank and the interior of the vent pipe.

In a preferred embodiment, the means for obstructing comprises a plate hinged to an upper portion of the opening of said second branch. The opening of the second branch is angled so that the plate hangs on the hinge without contacting the second branch. The hinge may be a spring loaded hinge which biases the plate in an open position to prevent the plate from obstructing the opening until a pressure differential exists between the interior of the fuel tank and the interior of the vent pipe which is sufficient to overcome the biasing force of the spring loaded hinge on said plate thus forcing the plate to obstruct fuel flow through the opening.

Thus, an object of the present invention is to provide a fuel tank venting apparatus which limits the fuel level within the tank while reducing fuel expulsion upon removal of the filler pipe cap after a tank pressure increase.

Another object of the present invention is to provide a vent pipe apparatus for a fuel tank which is has a minimum number of parts, is inexpensive to manufacture and easy to assemble, and which limits fuel expulsion from the fuel tank.

DETAILED DESCRIPTION OF THE PREFERRED EMBODIMENTS

Figure 1:
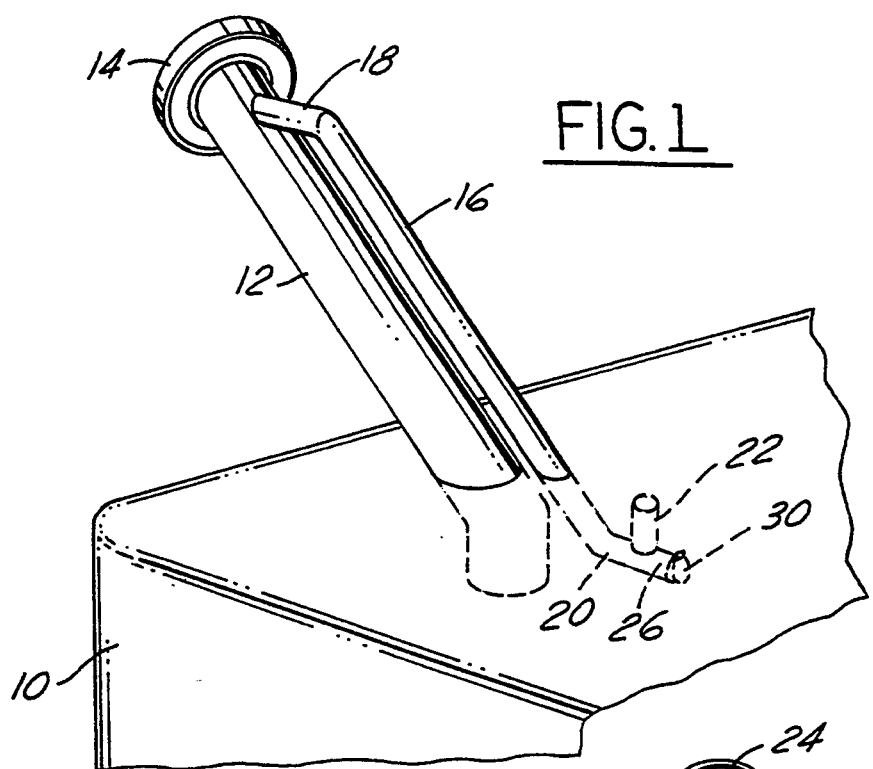
FIG. 1 is a perspective view of a fuel tank vent pipe according to the present invention shown attaching to the fuel filler pipe on an exterior portion of the fuel tank and extending into the tank interior.
Figure 2:
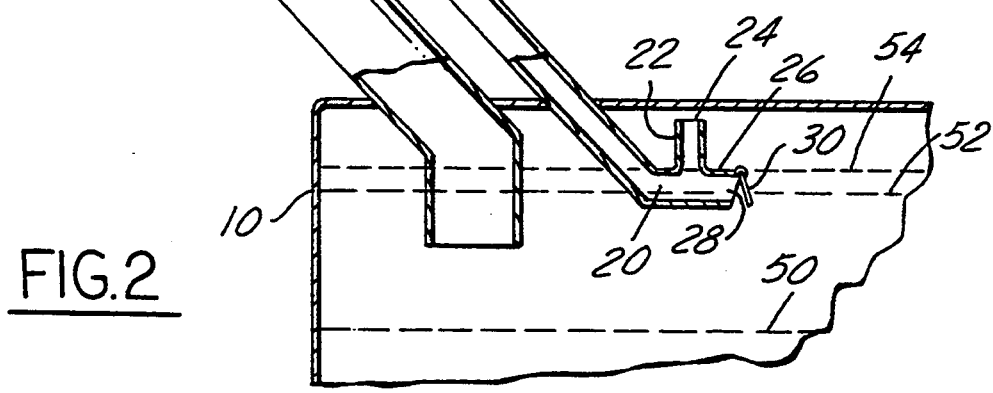
FIG. 2 is a schematic side view of a fuel tank vent pipe according to the present invention shown with an in-tank end divided into two openings, with one opening below the other opening, relative to the top of the fuel tank, and having a plate hingedly mounted above it for preventing expulsion of fuel through the vent pipe when fuel tank pressure exceeds atmospheric.

FIG. 1 shows a perspective view of an automotive fuel tank 10, partially cut away, with a fuel filler pipe 12 extending therefrom. Although not shown, filler pipe 12 contains a flap door assembly for entry of an unleaded fuel nozzle (not shown), and means, such as a check valve 34, for preventing fuel expulsion when the nozzle is removed. A fuel cap 14, which, for example, could be of the pressure relief type, detachably mounts to filler pipe 12 in a known manner (FIG. 2). Filler pipe 12 has attached thereto a vent pipe 16 for venting fuel vapor from tank 10.

Referring now to FIG. 2, vent pipe 16, preferably having a circular cross-section, has an upper portion 18 which attaches in fluid communication to filler pipe 12 at a point between fuel cap 14 and check valve 34. Upper portion 18 angles away from filler pipe 12 and bends at upper elbow 18a into vent pipe 16. Vent pipe 16 extends toward fuel tank 10 and runs generally parallel with filler pipe 12 until entering fuel tank 10 through inlet 17. Now within tank 10, vent pipe 16 bends into lower portion 20 at elbow 20a and runs parallel with fuel tank top 11. Lower vent portion 20 splits into two branches, an upper branch 22 and a lower branch 26. Upper branch 22 has upper opening 24 which is positioned between tank top 11 and lower opening 28 of lower branch 26.

In the preferred embodiment, upper branch 22 and lower branch 26 are at right angles, forming an L-shaped section (FIG. 2). The plane of opening 24 of upper branch 22 is preferably parallel to tank top 11. Lower branch 26 has opening 28, preferably circular in shape, which is angled relative to an axis extending from tank top 11 perpendicularly through opening 24 of upper branch 22, that is, a vertical axis. Opening 28 is angled so that plate 30, which is attached to an upper portion of lower branch 26, depends by gravity without contacting seats 28a as shown by the dotted position 30a in FIG. 4. Plate 30 preferably has a circular shape to correspond with the circular shape of lower branch 26.

Figure 3:
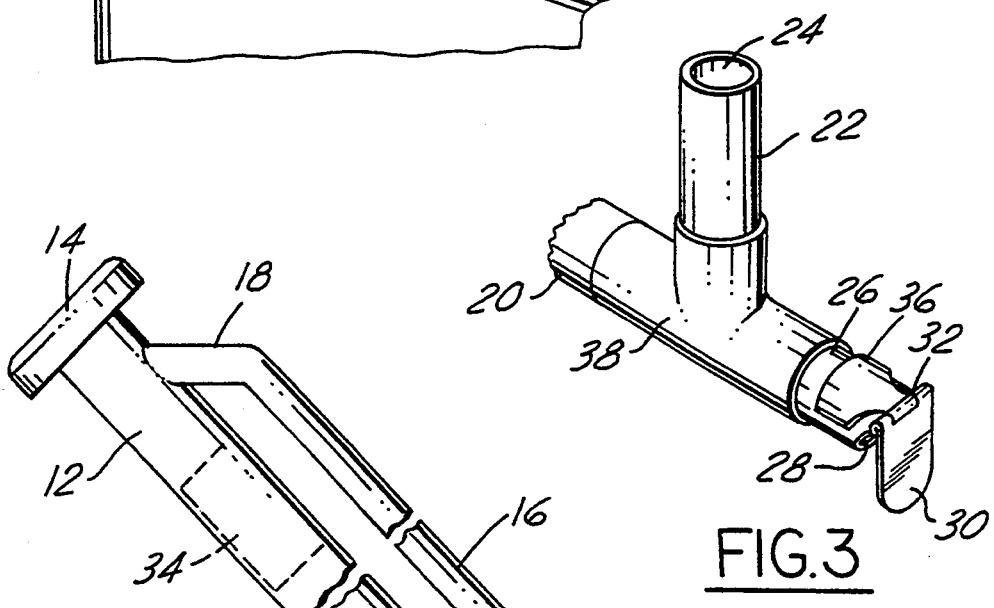
FIG. 3 is a detailed perspective view of the in-tank end of a fuel tank vent pipe according to the present invention showing a plate hingedly mounted above an angled lower opening.

A T-shaped connector 38 connects lower vent portion 20, upper branch 22, and lower branch 26 (FIG. 3). Plate 30 is mounted to hinge 32 for rotational movement relative an axis through hinge 32 and perpendicular the plane of FIG. 4. Hinge 32 attaches to hinge tab 36, preferably by welding. Hinge tab 36 mounts to an upper portion of lower branch 26, as seen in FIG. 3. Hinge 32 and hinge tab 36 can be one piece, preferably made of metal treated for corrosion resistance or fuel resistant plastic, with hinge tab 36 welded to lower branch 26 as described above. Hinge 32 may be lightly spring loaded to bias plate 30 in an open position 30a (FIG. 4) to prevent obstructing opening 28 until a pressure differential exists between the interior of fuel tank 10 and the interior of vent pipe 16 which is sufficient to overcome the biasing force of spring loaded hinge 32 and force plate 30 to seat on seats 28a thus obstructing fuel flow through opening 28, as is further described below.

During refueling, the liquid fuel level in tank 10, for example at level 50 (FIG. 2), begins to rise due to fuel entering filler pipe 12. As the fuel rises, gases within tank 10, such as fuel vapor and air, are forced through upper branch 22 and lower branch 26 of lower vent portion 20, into vent pipe 16, and out into filler pipe 12.

Figure 4:
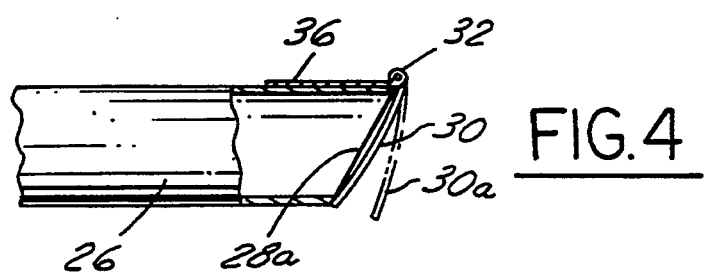
FIG. 4 is a side view of a lower branch portion of the present invention showing a plate hingedly mounted above an angled lower opening.

After rising to level 52, fuel begins to enter lower branch 26 through opening 28 and the gases vent only through upper opening 24 of upper branch 22. Plate 30 does not obstruct fuel flow into lower branch 26 since cap 14, which is necessarily removed from filler pipe 12 for entry of the fuel filler nozzle (not shown), allows the pressure in tank 10 to equalize with that in vent pipe 16, which normally is atmospheric pressure. Thus, plate 30 hangs in a vertical position 30a as shown in FIG. 4. When fuel reaches level 54 (FIG. 2), gases can no longer vent through vent pipe 16 as the liquid fuel obstructs both lower branch 26 and upper branch 22. Further entry of fuel into tank 10 causes a rapid increase in pressure due to compression of the gases in space 56 shutting off the fuel nozzle in a known manner. Cap 14 is then replaced on filler pipe 12 thus closing tank 10 from atmospheric pressure.

The fuel temperature in tank 10 may then rise due to hot fuel returning from the engine, fuel pump operation within the fuel tank, or normal diurnal temperature changes. Higher fuel temperature causes an increase in fuel evaporation and thus an increase in fuel vapor within the tank. Increased fuel vapor and fuel temperature can result in tank 10 pressure exceeding atmospheric pressure. Under such conditions, when cap 14 is again removed for refueling, plate 30 is forced to the closed position (FIG. 4), that is, to mate with seat 28a of lower branch 26, since tank 10 pressure is greater than the pressure within vent pipe 16. With opening 28 obstructed, liquid fuel expulsion through vent pipe 16 is prevented. Vapor pressure may still be relieved through opening 24 in tank vapor space 56 and branch 22. After tank 10 pressure equalizes to atmospheric pressure, plate 30 swings back to the open position 30a to allow gases and fuel to flow into lower vent portion 20 as described above.

Fuel vent pipe 16 and associated components, including plate 30, T-connector 38, and upper branch 22 and lower branch 26 are preferably made of steel treated to resist corrosion. Alternatively, fuel vent pipe 16 and associated components can be made of fuel resistant rubber or plastic or other plastic composite or non-plastic materials known to those skilled in the art and suggested by this disclosure.

Figure 5:
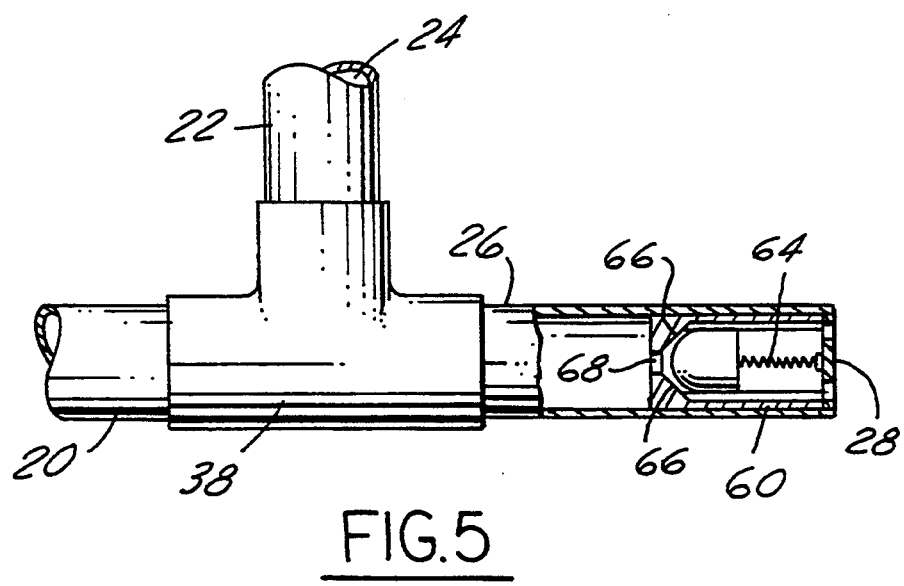
FIG. 5 is a detailed perspective view of the divided in-tank end of a fuel tank vent pipe according to the present invention showing a check valve mounted within the lower branch.

In an alternative embodiment shown in FIG. 5, check valve 60 within lower branch 26 serves to prevent fuel expulsion through vent pipe 16. Check valve 60, which can be of any type known to those skilled in the art, has plunger 62 which is biased in an open position, that is, not contacting seats 66, by spring 64. Fuel and gases enter lower branch 26 during refueling and flow through opening 28, around plunger, and through orifice 68. As in the embodiment previously discussed, when fuel fills lower branch 26, fuel vapor can no longer escape through vent pipe 16, the fuel filler nozzle (not shown) shuts off, and cap 14 is replaced on filler pipe 12. If a pressure build up occurs in tank 10 and cap 14 is removed for refueling, the pressure differential between tank 10 and vent pipe 16 (which is at atmospheric pressure) causes plunger 62 to seat on seats 68 thus preventing fuel expulsion through vent pipe 16. After tank pressure has equalized to atmospheric pressure, spring 64 pulls plunger 62 from seats 68 to allow gases and fuel to flow into lower vent portion 20 as described above.

Although the preferred embodiment of the present invention has been disclosed, various changes and modifications may be made without departing from the scope of the invention as set forth in the appended claims.

I claim:

1. An apparatus for venting fuel vapor from an automotive fuel tank having a top, the apparatus comprising:
    a fuel filler pipe extending into said fuel tank and having an exterior section protruding from said fuel tank;
    a vent pipe having a first end in communication with said exterior section of said filler pipe and a second end extending into the interior of said fuel tank, said second end having a first branch and a second branch, said second branch having an opening oriented below, relative to said top of said fuel tank, a vapor port in said first branch such that fuel filling said fuel tank causes the fuel level to rise and flow into said second branch until said fuel obstructs fuel vapor flow through said vent pipe; and
    means for obstructing fuel flow through said second branch when a pressure differential exists between said interior of said fuel tank and the interior of said vent pipe, said means for obstructing comprising a plate hinged to an upper portion of said opening of said second branch.

2. An apparatus for venting fuel vapor according to claim 1 wherein said means for obstructing comprises a check valve.

3. An apparatus for venting fuel vapor according to claim 1 wherein said opening of said second branch is angled so that said plate hangs on said hinge without contacting said second branch.

4. An apparatus for venting fuel vapor according to claim 1 wherein said plate is connected to an upper portion of said opening of said second branch with a spring loaded hinge which biases said plate in an open position to prevent said plate from obstructing said opening until a pressure differential exists between said interior of said fuel tank and the interior of said vent pipe which is sufficient to overcome the biasing force of said spring loaded hinge on said plate thus forcing said plate to a position in which fuel flow through said opening is obstructed.

5. An apparatus for venting fuel vapor according to claim 1 wherein said second end of said vent pipe has an L-shaped section with a first branch having a pore with a face parallel to the plane of said top of said fuel tank.

6. An apparatus for venting fuel vapor according to claim 1 wherein said opening and said second branch have circular cross-sections, and wherein said plate is circular shaped.

7. An apparatus for venting fuel vapor according to claim 1 wherein said vent pipe is made from a plastic composite material.

8. A fuel tank vent for venting fuel vapor from an automotive fuel tank having a top, comprising:
    a fuel filler pipe extending into said fuel tank and having an exterior section protruding from said fuel tank;
    a vent pipe having a first end in communication with said exterior section of said filler pipe and a second end extending into the interior of said fuel tank;
    an L-shaped section on said second end of said vent pipe, said L-shaped section having a first branch with a vapor port having a face parallel to the plane of said top of said fuel tank and a second branch having an opening oriented below, relative to said top of said fuel tank, said vapor port in said first branch such that fuel filling said fuel tank causes the fuel level to rise and flow into said second branch until said fuel obstructs fuel vapor flow through said vent pipe; and
    means for obstructing fuel flow through said second branch to prevent fuel expulsion through said vent pipe when said filler pipe is exposed to atmospheric pressure, said means for obstructing comprising a plate hinged to an upper portion of said opening of said second branch.

9. A fuel tank vent apparatus for venting fuel vapor from an automotive fuel tank having a top, the apparatus comprising:
    a fuel filler pipe extending into said fuel tank and having an exterior section protruding from said fuel tank;
    a vent pipe having a first end in communication with said exterior section of said filler pipe and a second end extending into the interior of said fuel tank;
    an L-shaped section on said second end of said vent pipe, said L-shaped section having a first branch with a vapor port having a face parallel to the plane of said top of said fuel tank and a second branch having an opening oriented below, relative to said top of said fuel tank, said vapor port in said first branch such that fuel filling said fuel tank causes the fuel level to rise and flow into said second branch until said fuel obstructs fuel vapor flow through said vent pipe; and
    means for obstructing fuel flow through said second branch to prevent fuel expulsion through said vent pipe when a pressure differential exists between said interior of said fuel tank and the interior of said vent pipe, said means for obstructing comprising a plate hinged to an upper portion of said opening of said second branch.

10. A fuel tank vent according to claim 9 wherein said means for obstructing comprises check valve.

11. An apparatus for venting fuel vapor according to claim 9 wherein said opening of said second branch is angled so that said plate hangs on said hinge without contacting said second branch.

12. An apparatus for venting fuel vapor according to claim 11 wherein said plate is connected to an upper portion of said opening of said second branch with a spring loaded hinge which biases said plate in an open position to prevent said plate from obstructing said opening until a pressure differential exists between said interior of said fuel tank and the interior of said vent pipe which is sufficient to overcome the biasing force of said spring loaded hinge on said plate thus forcing said plate to obstruct fuel flow through said opening.

13. A fuel tank vent according to claim 9 wherein said opening and said second branch have circular cross-sections, and wherein said plate is circular shaped.

14. A fuel tank vent according to claim 9 wherein said vent pipe is made from a plastic composite material.

* * * * *